Figure 1:
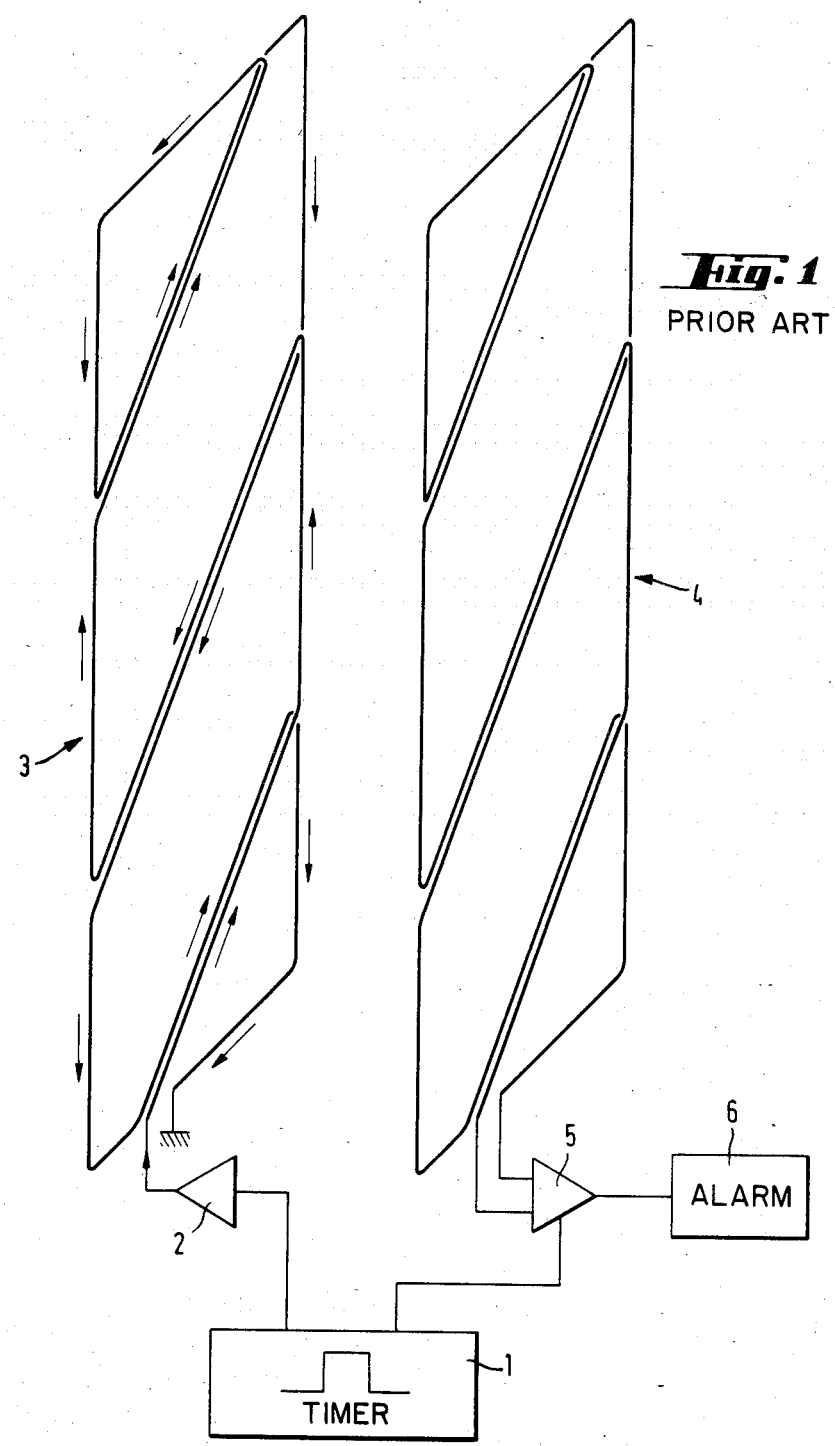

United States Patent [19]

Aittoniemi et al.

[11] Patent Number: 4,605,898
[45] Date of Patent: Aug. 12, 1986

[54] PULSE FIELD METAL DETECTOR WITH SPACED, DUAL COIL TRANSMITTER AND RECEIVER SYSTEMS

[75] Inventors: Kari T. J. Aittoniemi; Erkki S. Kiuru, both of Espoo; Aatu V. K. Lappalainen, Helsinki; Kalevi Savolainen, Espoo, all of Finland

[73] Assignee: Outokumpu Oy, Helsinki, Finland

[21] Appl. No.: 750,054

[22] Filed: Jun. 27, 1985

Related U.S. Application Data

[63] Continuation of Ser. No. 439,394, Nov. 4, 1982, abandoned.

[30] Foreign Application Priority Data

Nov. 6, 1981 [FI] Finland ............................ 813502

[51] Int. Cl.⁴ .................... G01R 33/12; G08B 13/24
[52] U.S. Cl. .................... 324/232; 324/243; 340/551
[58] Field of Search ............... 324/226, 232, 239, 243; 340/551, 552, 572

[56] References Cited

U.S. PATENT DOCUMENTS

| | | | |
|---|---|---|---|
| 2,938,163 | 5/1960 | Roffman et al. | 324/232 |
| 3,156,862 | 11/1964 | Herrick | 324/232 |
| 3,588,685 | 6/1971 | Fallenius et al. | 324/243 |
| 3,697,972 | 10/1972 | Brown | 324/232 X |
| 3,697,996 | 10/1972 | Elder et al. | 324/260 |
| 3,758,849 | 9/1973 | Susman et al. | 324/243 |
| 3,889,249 | 6/1975 | Bennett et al. | 324/243 X |
| 3,938,125 | 2/1976 | Benassi | 340/572 |
| 4,063,230 | 12/1977 | Purinton et al. | 340/551 X |
| 4,135,183 | 1/1979 | Heltemes | 340/572 |
| 4,308,530 | 12/1981 | Kip et al. | 340/551 X |

Primary Examiner—Gerard R. Strecker
Attorney, Agent, or Firm—Brooks Haidt Haffner & Delahunty

[57] ABSTRACT

The apparatus of the invention comprises at least two transmitter coils (3) and a respective number of receiver coils (4). The transmitter coils (3) and the respective receiver coils (4) are placed in a crosswise position with respect to each other so that the primary fields created by the transmitter coils (3) are divergent.

5 Claims, 4 Drawing Figures

PULSE FIELD METAL DETECTOR WITH SPACED, DUAL COIL TRANSMITTER AND RECEIVER SYSTEMS

This application is a continuation of application Ser. No. 439,394, filed Nov. 4, 1982, now abandoned.

The present invention relates to an apparatus for detecting metal objects, the said apparatus comprising at least two crosswise adjusted transmitter coils and an equal number of receiver coils which are placed in similar position with respect to each other. The transmitter coils create in the coil system divergent primary fields, which fields change their direction and size according to their location and in turn create eddy currents in the objects moving within the said primary fields. The secondary field created by the moving object in turn induces a signal in at least one receiver coil. The invention also comprises means for amplifying and processing the signal.

A metal detector based on eddy currents consists of two main parts. The transmitter coil creates an alternating magnetic field in a certain area. In case there are electrically conducting objects within the field, eddy currents will be induced in them. The field created by these eddy currents is observed by the receiver coil. It is necessary for the detection that at least at one point on the path of the object through the detector gate there exists an exciting field which has such a direction that it creates eddy currents in the test object. The gate encompasses the area in which the apparatus can detect the object as it is on its path therethrough. It is also necessary that the receiver system is able to effectively measure the said currents at the said point in space.

Initially, a ball-shaped object is observed. Owing to its symmetry, the power of the eddy currents created therein is not dependent on the direction of the exciting field with respect to the ball. The eddy currents circulating within the ball create outside them a similar magnetic field as the magnetic dipole source having the same direction as the exciting field and being placed at the center of the ball, which dipole source is comparable to the power of the exciting field; its size naturally also depends on the parameters of the ball. The connection of such dipole source to the receiver coil can be observed by means of the so-called detector field of the receiver (i.e. a hypothetical magnetic field is created by driving rated current to the receiver chords). The dipole response in the receiver coil is comparable to such a component of the said detector field, which component is parallel to the dipole at the point in question. Thus the response $A_{p(\bar{r})}$ at the point $\bar{r}$ is comparable to the product $$A_p(\bar{r}) \sim \bar{B}_T(\bar{r}) \cdot \bar{B}_R(\bar{r}), \qquad (1)$$

where $\bar{B}_T$ is the flux density of the transmitter field and $\bar{B}_R$ is the flux density of the receiver detector field.

Next we shall observe a magnetic, electrically conducting bar (for example length/thickness $\geq 10$). Experience has shown that this kind of bar is capable of being magnetized in its lengthwise direction. Now the response $A_s(\bar{r})$ is comparable to the product $$A_s(\bar{r}) \sim (\bar{B}_T(\bar{r}) \cdot \bar{R}_o)(\bar{B}_R(\bar{r}) \cdot \bar{R}_o), \qquad (2)$$

where $\bar{R}_o$ is a unit vector having the same direction as the bar.

With a non-magnetic bar the situation is somewhat different. With such objects the maximum response is generally obtained as the eddy currents circulate the long sides of the bar. The same kind of dependence as in the formula (2) is applicable in this case, too, but now the vector $\bar{R}_o$ has to be figured out as perpendicular to the bar.

According to the formulas (1) and (2) it is apparent that the transmitter and receiver systems have an equally important position in creating the signal.

The U.S. Pat. No. 3,697,996 introduces a method for creating eddy currents in objects with divergent directions by means of several successively operated transmitter coil systems. In the patent there is no mention of receiving system. On the basis of the above description it is clear that the transmitter system of the U.S. Pat. No. 3,697,996 connected to a conventional receiver does not essentially improve the directionality properties of the apparatus.

The Finnish Pat. No. 40646 introduces a coil configuration realizing the above described principles. Its application to practice essentially requires a gate which is long in the direction of travel therethrough. In practice the most desired coil system is a compact one. Moreover, the method presented in the FI-Patent No. 40646 is mainly designed for an apparatus with continuous operation; in such an apparatus the exciting magnetic field is switched on during the measuring, too. Consequently the geometry of the coils has to be designed so that the mutual inductance between the trasmitter coil and the receiver coil is eliminated.

The method described in the U.S. Pat. No. 3,758,849 uses two transmitter coils and two receiver coils, placed crosswise. The transmitter coils are, however, simultaneously driven with harmonic current, so that irrespective of the crosswise located transmitter coils, only one transmitter field is created. It is also apparent that in the method of the U.S. Pat. No. 3,758,849, an object which passes through the gate at a certain geometric point in the middle of the gate, so that the direction of its profitably induced eddy current joins the proceeding direction, will pass unnoticed. Moreover, the U.S. Pat. No. 3,758,849 also presupposes null connection between the transmitter and receiver coils, which does not allow for ideal geometry.

The purpose of the present invention is to eliminate the drawbacks of the prior art and to realize a remarkably improved apparatus for detecting metal objects so that irrespective of the moving positions of the objects which pass through the alternating magnetic field, the so-called dead points are avoided—i.e. those points where the metal objects passing through the alternating magnetic fields would not create eddy currents for initiating the signal.

One remarkable advantage of the present invention is that the apparatus gives a signal response of roughly equal level irrespective of the position in which an elongated object passes through the gate.

Figure 2:
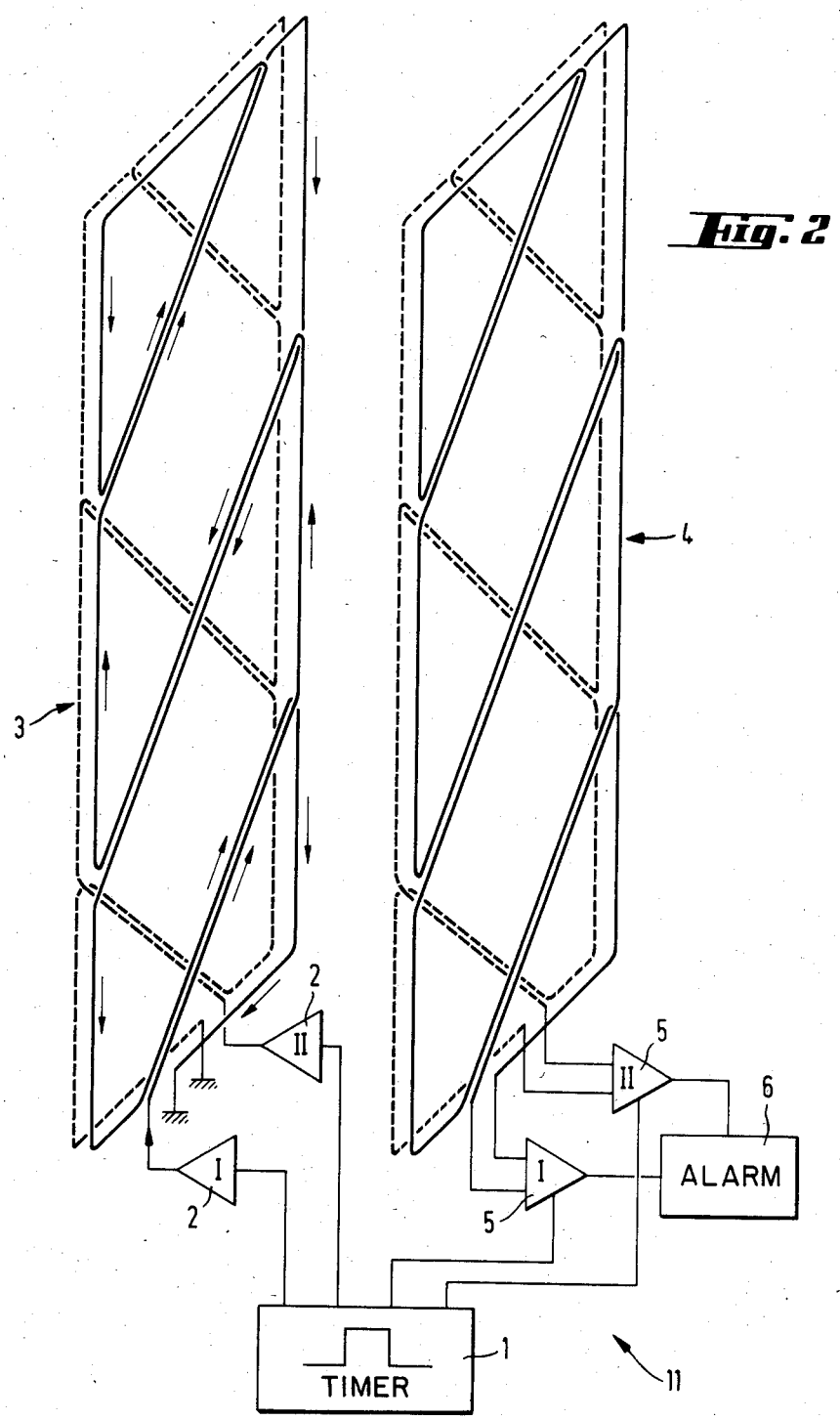
Figure 3:
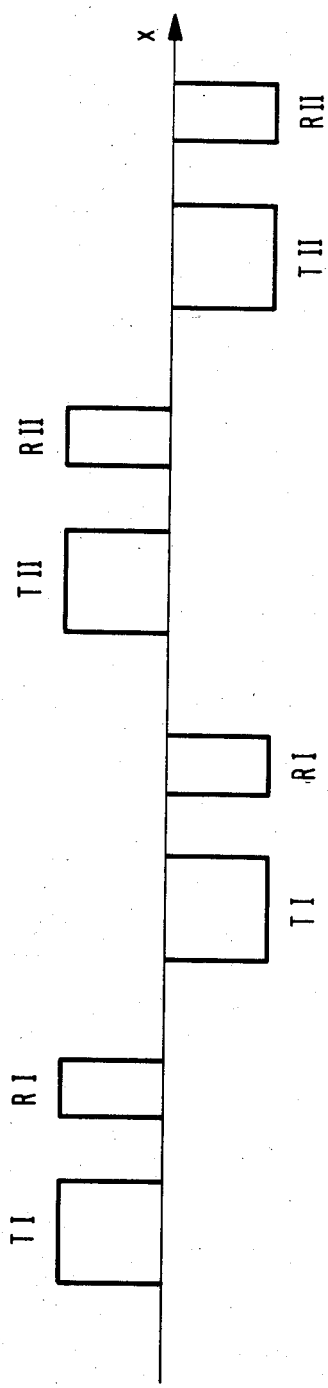
Figure 4:
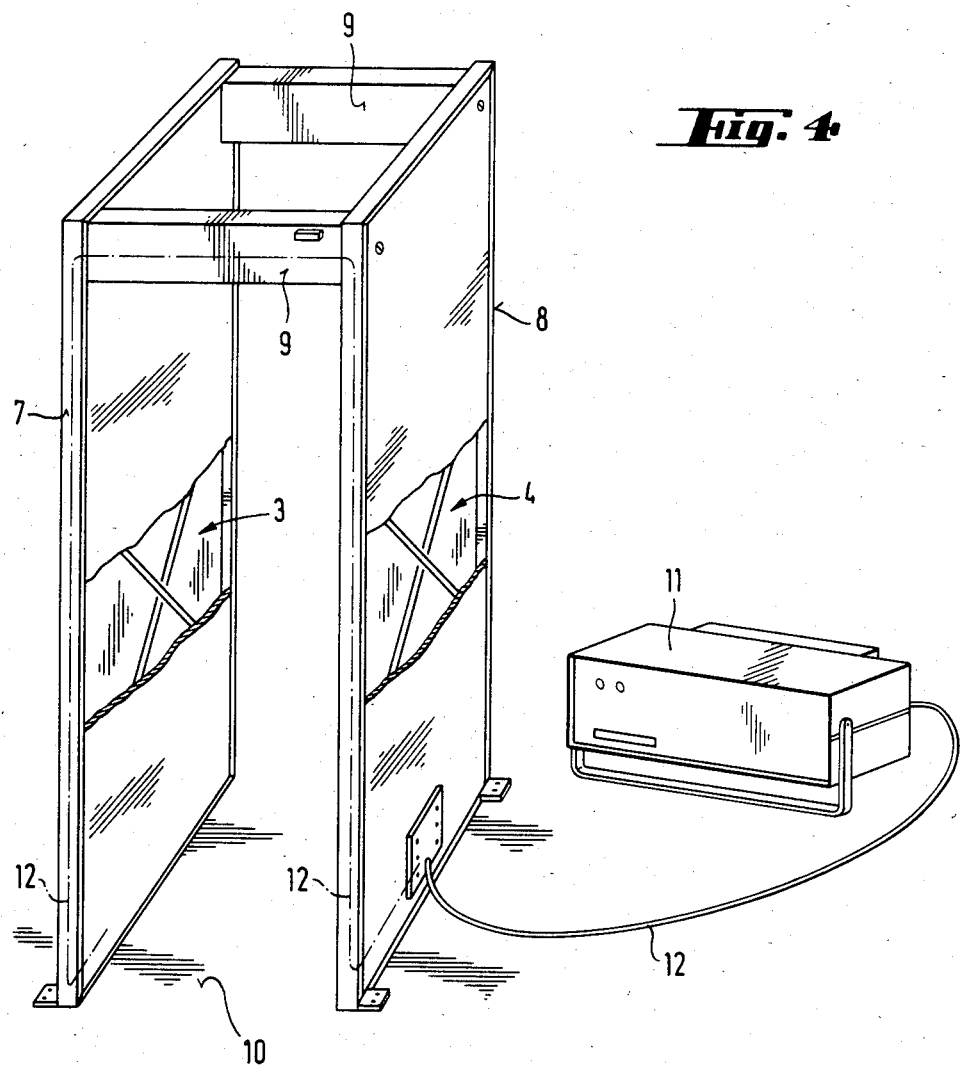

In the following the invention will be described with reference to the appended drawings, where FIG. 1 shows a conventional metal detector embodiment, FIG. 2 shows a preferred embodiment of the apparatus according to the present invention, FIG. 3 shows the pulse diagram of the timer, which is essentially connected to the present invention, the said diagram illustrated on a time axis, and FIG. 4 shows one preferred embodiment of the invention in operation.

According to FIG. 1, current pulses are fed into the transmitter coil 3 by means of the timer 1 and the power amplifier 2. The sampling amplifier 5 is activated in order to pick a sample of the signal from the receiver coil 4 a short while after the transmitter pulse has ended. Now the exciting field is no longer effective, wherefore the response is bound to be initiated by a foreign metal object. Because the exciting field is not switched on during the measurement in a pulse-operated device, a mutual minimum connection between the receiver and the transmitter is not required.

In the apparatus of FIG. 1, the mutual adjusting of the transmitter field and the detector field of the receiver (i.e. an effective observation of a maximum eddy current induction) is carried out by means of coils which are located on both sides of the gate and are essentially of a similar shape. It can be observed that in the case of FIG. 1, while transporting a steel bar through the gate in the direction of the diagonal chords, the apparatus gives a very weak response for the said object. Respectively, if the object is transported in perpendicular position, the response reaches its maximum.

FIG. 2 illustrates a preferred embodiment of the present invention, which is combined of two essentially similar coil systems the coils of each of which two coil systems are wound in substantially the same plane, the systems being placed in an inverted and displaced position with respect to each other, each coil system comprising two transmitter coils 3 and two receiver coils 4. The timer 1 controls in successive turns the power amplifiers 2, which amplifiers alternately feed the two transmitter coils 3 by using pulse technique. The transmitter fields created by the coils 3 have divergent directions. Now eddy currents are bound to be induced in the object passing through the coil system at least at one point, irrespective of the location, position or shape of the said object. The timer 1 also controls two sampling amplifiers 5 synchronized to the transmitters 3 so that the eddy currents induced by the two transmitter channels are each measured on a separate receiver channel. If the response of the object exceeds the predetermined alarm level, the apparatus initiates an alarm by means of the alarm device 6.

As can be seen from the drawing of FIG. 2, the two generally planar transmitter coils 3 shown at the left of the Figure and the two generally planar receiver coils 4 shown at the right of the Figure are, in the case of each said pair of two coils juxtaposed on top of each other so as to be in essentially the same plane with their respective loops in mirror image relationship to each other, the coils 3 being spaced and separated from the coils 4.

FIG. 3 illustrates the operation of the timer 1 in the form of a pulse diagram. The detector fields of the receivers 4 are divergent at all points and are directed so that the eddy currents induced by each transmitter 3 with respect to a receiver 4 can be measured. It is observed that when for example a steel bar passes through the gate in a position where for instance the system I produces almost a zero response, the system II produces a maximum response. Consequently the response of the apparatus of FIG. 2 is far less dependent on the position and shape of the object and forms essentially less so-called dead points than the response from the apparatus of FIG. 1.

In the above specification only one preferred embodiment of the present invention has been described, but it is clear that the apparatus of the invention can be constructed in various similar ways in order to achieve the advantageous features of the apparatus, for example by applying in the receiver coils 4 an essentially higher number of turns than in the transmitter coils 3.

According to FIG. 4, the transmitter coils 3 and the receiver coils 4 are covered, in an advantageous application of the apparatus, with protective plates 7 and 8, which are attached to each other by means of joining plates 9. The protective plates 7 and 8 are further firmly attached to their base 10. The timer 1, the power amplifiers 2 and 5 and the alarm device 6, which are all essential members of the invention, are combined in the electronic unit 11, which is connected to the apparatus by means of the cable 12.

We claim:

1. An apparatus for detecting metal objects, the said apparatus comprising a transmitter coil system and a receiver coil system spaced and separated from said transmitter coil system to allow the passage of objects to be detected between the two systems, the transmitter coil system consisting of at least two coils for creating divergent primary fields which change their direction and size according to their location, which primary fields in turn create eddy currents in an object moving within the said primary fields, whereafter the secondary field created in the object induces a signal in the receiver coil system, as well as means for amplifying and processing the signal, wherein the transmitter coil system is formed of at least two planar coils, each planar coil comprising a plurality of planar loops extending in a given direction and encompassing a predetermined area, said planar coils being juxtaposed, one on top of the other, so as to lie substantially within the same plane in said predetermined area, with the loops of one of said coils being in mirror image relationship with respect to the loops of the other of said coils so that the magnetic fields created by the coils are divergent and that the receiver coil system is also comprised of the same number of coils as the transmitter coil system which coils are placed with respect to each other in a similar relationship to that of the coils of the transmitter coil system, means for alternately energizing said at least two transmitter coils, and means synchronized with said energizing means for alternately sampling signals induced in said receiver coils and feeding said sampled signals to said means for amplifying and processing the signal.

2. The apparatus of claim 1, wherein the transmitter and receiver coil systems are essentially identical in shape.

3. The apparatus of claim 1, wherein the transmitter and receiver coil systems have essentially identical windings.

4. The apparatus of any one of the above claims, wherein the eddy currents induced by the separate transmitter coils are each measured by a receiver coil which is in a position corresponding to the transmitter coil in question.

5. The apparatus of any one of the claims 1 through 3, wherein a timer is used for controlling both the transmitter coils and the receiver coils.

* * * * *